United States Patent [19]
Snell et al.

[11] Patent Number: 5,236,601
[45] Date of Patent: Aug. 17, 1993

[54] CONTROL PROCESS FOR A BODYFEED FILTER SYSTEM TO COMPLETE INJECTION BY FILTRATION ENDPOINT

[75] Inventors: Darrell E. Snell; Stephen G. Harris, both of Benecia, Calif.

[73] Assignee: J. R. Schneider Co., Inc., Benicia, Calif.

[21] Appl. No.: 913,280

[22] Filed: Sep. 8, 1992

[51] Int. Cl.$^5$ .............................................. B01D 37/02
[52] U.S. Cl. .................................... 210/741; 210/143; 210/193; 210/744; 210/778
[58] Field of Search ............... 210/101, 143, 193, 741, 210/744, 777, 778, 139, 138, 198.1; 55/97; 364/502

[56] References Cited

U.S. PATENT DOCUMENTS

| | | | |
|---|---|---|---|
| 489,084 | 1/1893 | Morgan | 210/198.1 |
| 2,971,648 | 2/1961 | Lane et al. | 210/778 |
| 3,348,685 | 10/1967 | Miller | 210/193 |
| 4,118,778 | 10/1978 | Strub | 210/193 |
| 4,514,306 | 4/1985 | Pato | 210/741 |

*Primary Examiner*—Joseph W. Drodge
*Attorney, Agent, or Firm*—Townsend and Townsend

[57] ABSTRACT

An automated computer protocol is disclosed for the dispensing rate of a filter aid slurry into a pressure or vacuum filter in order to efficiently use filter aid and disposable filter septum. The control system accepts three input variables; these variables are total time of filter use, differential pressure across the filter media and the volume (level) in the (slurry or filter aid) bodyfeed tank for augmenting the filter performance. In the disclosed protocol, these variables are processed in turn to vary the rate in which bodyfeed will be introduced into the filter. Specifically, and on an adjustable incremental basis, the pressure differential is monitored across the filter. This differential is compared to that differential which would exist if the filter had reached the end of service life "set point"—which requires septum replacement and cleaning. The total quantity of bodyfeed available and the rate at which bodyfeed is being added to the filter are monitored. An extrapolation of successive filter differential pressure against time is used to plot the slope of the pressure differential curve and predict operating time to the filter set point based on discrete selected operating intervals including a given number of sample points. This is in turn used to control the bodyfeed rate to the filter. These disclosed controls result in the filter reaching its terminal set point pressure at over the greatest possible time interval.

6 Claims, 2 Drawing Sheets

CONTROL PROCESS FOR A BODYFEED FILTER SYSTEM TO COMPLETE INJECTION BY FILTRATION ENDPOINT

This invention relates to filters. More specifically, a programmable logic controller is utilized to release bodyfeed into fluid to be filtered so that the filter obtains the maximum in service life between required cleanings or the timely depletion of the bodyfeed tank.

BACKGROUND OF THE INVENTION

Introduction

When filtering certain types of materials a dense deposit can form on the filter bed and cause the filter to become clogged very quickly. This requires that the filter be cleaned frequently. The life of the filter bed can be extended by mixing a filter aid (commonly referred to as "bodyfeed") such as diatomaceous earth with the liquid being filtered and/or as a pre-coat for the filter media. The enhanced efficiency of a "bodyfeed" filter system of this type more than pays for the added cost of the system and the filter aid.

In many cases the load on the filter is not constant over time. In these cases, the filter aid should be added at a rate consistent with the level of contamination of the liquid being filtered. When this approach is taken, the operating time of the time of the filter can be increased even more.

The present method of bodyfeeding a pressure or vacuum filter requires operator input to control the rate of bodyfeed injection. The most common procedure of optimizing this injection rate is to adjust the "bodyfeed injection rate time" to a rate high enough to accommodate the maximum foreseeable dirt load. This results in a shorter cycle time that would be otherwise witnessed if the injection rate was adjusted to the load at any time. Due to the tedious as well as time consuming task this method would take, it is not the normal practice in an industrial setting. Some examples of inefficient timer settings would be the process equipment that generates the dirt load being at idle for some period of time; if the timer were set for the anticipation of a given dirt load and there was none generated, this would result in an inappreciable pressure increase and a depletion of the bodyfeed tank. When the dirt load resumed, the filter would immediately go to pressure. Another example would be if a low injection rate was set in anticipation of a light dirt load; if the load increased a short filter cycle would result.

A previous solution to this problem was the use of an electro-mechanical device that changed the bodyfeed rate of a pressure diatomaceous earth water filter. This system was used to filter suspended solids from river water. Due to variables in solids concentrations as a result of seasonal changes as well as vessel traffic, this device was needed. The sensing device was a turbidimeter which measured the loss of light across a fixed gap of incoming water. This signal was then used to select from a group of preset times that would vary the bodyfeed injection rate. The higher the turbidity, the higher the injection rate. Due to the inherent problems associated with turbidimeters used in industrial applications such as the fouling of the sensing cell and the resulting need of maintenance and recalibration, this system proved less than desirable.

This system did not feature the integration of a "bodyfeed level signal" which supplies another signal to better optimize the length of filter cycle run. As the dirt load increased the bodyfeed rate increased the resulting pressure would increase closer to the termination pressure. This would sometimes result in the bodyfeed tank being less than empty. Since the bodyfeed tank has the desired amount of filter aid needed to form the optimum cake thickness, any filter termination occurring with less than an empty bodyfeed tank would result in an inefficient use of the disposable filter aid support septum.

SUMMARY OF THE INVENTION

An automated computer protocol is disclosed for the dispensing rate of a filter aid "bodyfeed" slurry into a pressure or vacuum filter in order to efficiently use filter aid and disposable filter septum. The control system accepts three input variables; these variables are total time of filter use, differential pressure across the filter media and the volume (level) in the (slurry or filter aid) bodyfeed tank for augmenting the filter performance. In the disclosed protocol, these variables are processed in turn to vary the rate in which bodyfeed will be introduced into the filter. Specifically, and on an adjustable time incremental basis, the pressure differential is monitored across the filter. This differential is compared to that differential which would exist if the filter had reached the end of service life "set point"—which requires septum replacement and cleaning. The total quantity of bodyfeed available and the rate at which bodyfeed is being added to the filter are monitored. An extrapolation of successive filter differential pressure against time is used to analyze the rate of the pressure differential curve increase. A predicted operating time to the filter set point is computed based on discrete selected operating intervals including a given number of sample points. This is in turn used to control the bodyfeed rate to the filter. These disclosed controls result in the filter reaching its terminal set point pressure at over the greatest possible time interval. The system enables variances in solids concentration being filtered to be accommodated while preserving the maximum time interval between required filter replacements. Provision is made to vary the time sample for slope determination depending upon consistency of the material being filtered as well as the pressure differential response of the filter.

DESCRIPTION OF THE PREFERRED EMBODIMENT

Figure 1:
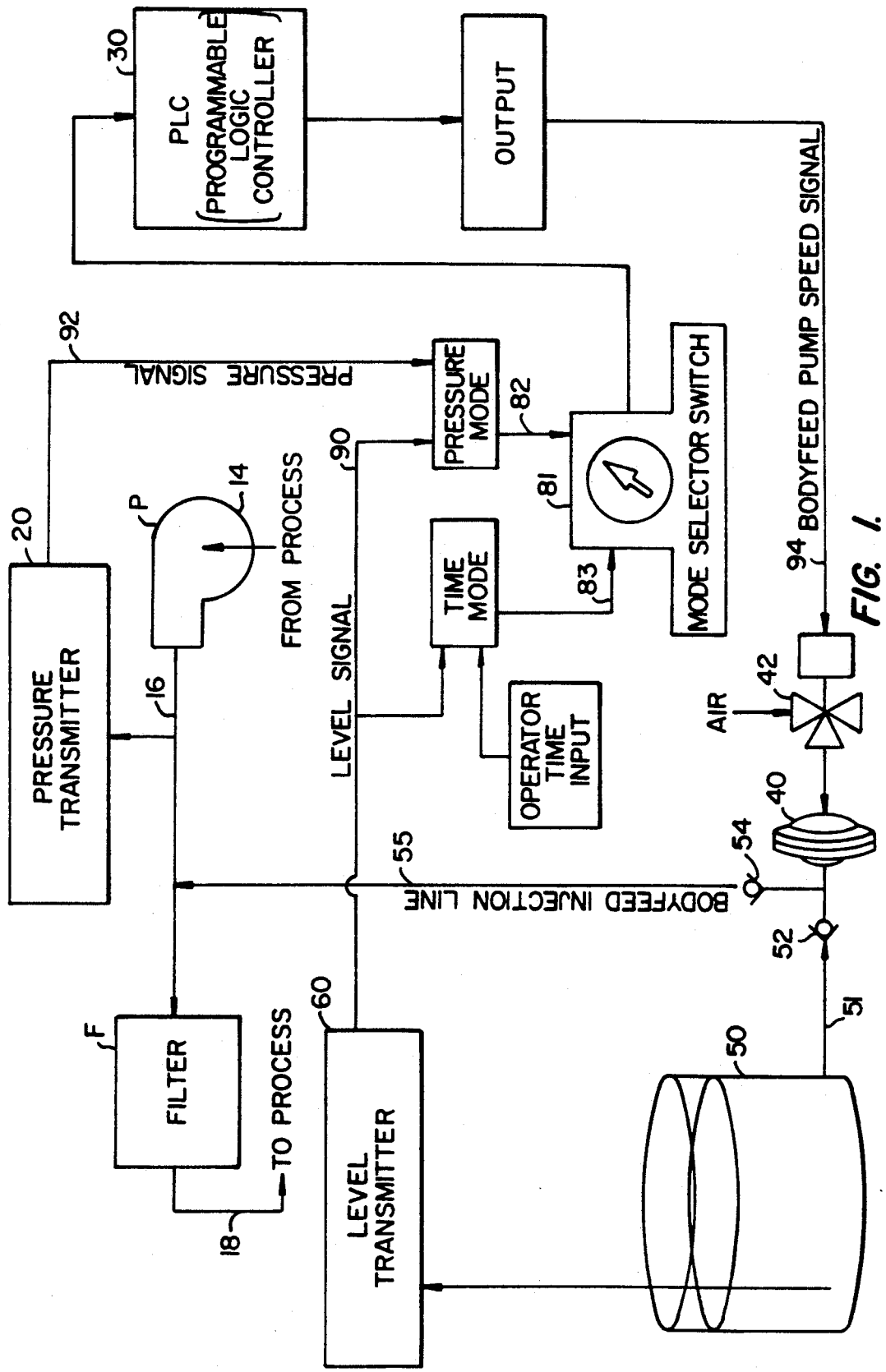
FIG. 1 is a schematic of the bodyfeed system of this invention applied to an unfiltered fluid from a process illustrating schematically the respective fluid and signal routings to obtain maximum system operating time in accordance with the protocol of this invention; and, FIG. 2 is a time based plot of filter inlet (differential) pressure plotted against time with three windows of slope analysis being shown for three corresponding estimates of filter end point operation illustrating three computed end points.

The program and control strategy described are used to control a bodyfeed filter system such as that shown in FIG. 1 below. The filter system described below is used to filter the oil used in a rolling mill which is a typical application of this type of filter system. As shown in the attached schematic, oil from process is inlet to pump P at inlet 14. Discharge occurs at outlet 16 to filter F.

After passing through filter F, oil returns to process at discharge 18.

A pressure transducer 20 measure the pressure differential occurring across filter F. It will be understood that although only one pressure sampling point is here shown, what must be measured is the usually increasing filter differential pressure across filter F. Accordingly, and dependent upon the type of filter utilized, more than one pressure transducer may be utilized.

The control system for this filter is implemented in PLC (programmable logic controller) 30 that contains a programmable co-processor. The co-processor shares memory and I/O (input/output) with PLC 30 and is programmed in a dialect of the BASIC programming language, an intelligible listing of which is provided below. The PLC provides the primary control of the elements of the filter and operates the filter independently when it is run in manual mode. The program in the co-processor provides control of the bodyfeed pump 40 when the filter is operated in the automatic modes.

Completing the summary of FIG. 1, bodyfeed tank 50 outputs through respective check valves 52, 54. Air driven bodyfeed pump 40 through air valve 42 monitors bodyfeed outflow by first drawing in a positively displace amount of bodyfeed from conduit 51 through check valve 52 and then discharging the bodyfeed through check valve 54 into conduit 16 before the unfiltered fluid reaches filter F. Thus the bodyfeed is introduce to the filter F with the fluid to be filtered.

Level transmitter 60 outputs the (level) volume of bodyfeed remaining in tank 50. Since it is common practice to introduce sufficient bodyfeed to fully charge filter F when it reaches its setpoint, typically bodyfeed tank 50 level transmitter will output a signal indicative of the total remain volume of bodyfeed available.

During operation, the filter F cycles through three operating phases. First the filter media is precoated with the filter aid. Second, the filter is then used to filter the oil from the mill. Bodyfeed is continually added to obtain optimum filter performance. Thereafter, the filter reaches the setpoint. In common parlance, it becomes unacceptably clogged with both the filtered material and the bodyfeed and operation of the filter must stop. Third, the filter F is then cleaned and made ready for precoating.

The filter can be operated in three modes set at switch 80; manual 81, automatic 82 and timed automatic 83.

Manual mode 81 is operator controlled. The operator sets the rate of the bodyfeed pump from the control panel and it remains at the set rate until the operator changes it.

Automatic mode 82 uses the control strategy programmed in the co-processor to set the rate of the bodyfeed pump. In this mode the strategy is to extend the time the filter can operate as long as possible. This is accomplished by using the inlet pressure of the filter as an indication of how clogged filter F is. A pressure setpoint is established which is used to indicate the point at which the filter must be cleaned. The inlet pressure verses time relationship is measured and used to continuously adjust the rate of the bodyfeed pump.

The objective of this strategy is to exhaust the supply of bodyfeed at the same time the inlet pressure reaches its setpoint. This assumes that the amount of bodyfeed required is determined by the total contamination load. This is equivalent to saying that when a fixed amount of bodyfeed has been added to the system that the inlet pressure will have reached its setpoint and the filter will have to be cleaned. The operating time of the filter can therefore be maximized by adding bodyfeed at a rate proportional to the contamination load of the fluid being filtered.

Timed Automatic mode uses the co-processor to set the bodyfeed pump rate so that the supply of filter aid is exhausted after a set time interval. This mode monitors the pressure verses time relationship in the same manner as during operation in Automatic mode. If this relationship indicates that the pressure setpoint will be reached before the set time, then the control program attempts to extend the time by reverting to the control strategy used during Automatic mode operation. The predicted time remaining before a clean cycle is required is always displayed for the operators information.

PRINCIPLES OF OPERATION

During operation the control program periodically samples the bodyfeed tank level and the filter inlet pressure. The bodyfeed pump is a diaphragm type and pumps a fixed amount of fluid on each stroke. The count of the pump strokes is also monitored in order to continuously calibrate the pump volume per stroke. The pump stroke period is set by the control program. These inputs are shown 90, 92, and 94 respectively. It will be realized that output bodyfeed signal is shown at 94; the reader will understand that so long as this signal is indicative of the volume of bodyfeed being pumped, the signal will suffice for the disclosed logic.

Figure 2:
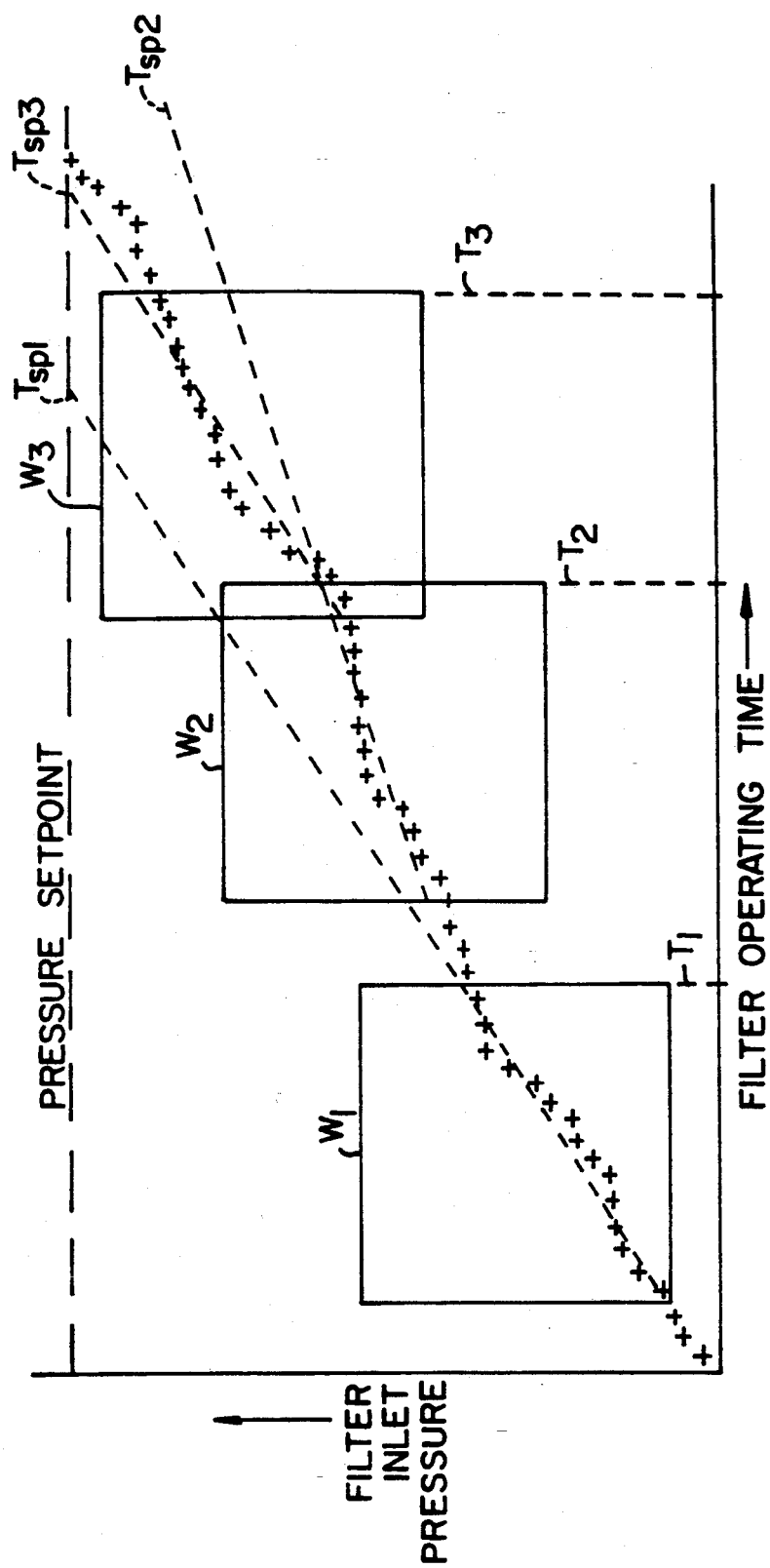

Referring to FIG. 2, a plot of filter inlet pressure versus time is set forth. Pressure setpoint is set forth at 100. The filter inlet pressure readings, sampled over a specified period of time are plotted. In actual fact, these respective values are stored in the control program in the co-processor.

The program is subdivided to operate in discrete time intervals required for analysis. Consequently, windows $W_1$, $W_2$, and $W_3$ are shown. Each of these respective windows constitutes a window moving along the pressure verses time history of the filter operation and is used to predict the time at which the inlet pressure will reach its setpoint. FIG. 2 shows a pressure verses time curve for a typical filter. Three windows $W_1$, $W_2$, and $W_3$ are shown that depict snapshots of this curve as they would exist stored in the control program at the times $T_1$, $T_2$ and $T_3$.

The data points stored in the control program are updated each tune the control loop is run. At that time the oldest point is deleted and the newest point is added. In this manner the data window moves along in tune but always contains the same amount of history. The exception to this is at the time when the filter is first started running. Until a sufficient time has elapsed the number of points contained in the window is increasing.

The pressure verses time data contained in the control program is used to predict the time at which the inlet pressure will reach a value equal to the pressure setpoint. This is accomplished by fitting a straight line to the data by using the Least Squares method. This provides values for the intercept, $P_0$, and the Slope, in the following equation.

$$Pressure = Slope * Time + P_0 \qquad (1)$$

The time at which the inlet pressure will reach the setpoint, $T_{sp}$, can then be calculated from the following equation.

$$T_{sp} = (P_{sp} - P_0)/Slope \quad (2)$$

where: $P_{sp}$ is the pressure setpoint.

This prediction is made for each cycle of the control loop regardless of the operating mode of the filter. FIG. 2 shows the results of the least squares fit (LSF) for the data points in each of the three windows. They are shown as the dotted lines originating in each of the windows and extending until they intersect with the pressure setpoint line. The times predicted for the inlet pressure to reach the setpoint are shown as $T_{sp1}$, $T_{sp2}$ and $T_{sp3}$ (the intersection of the LSF lines with the pressure setpoint line).

In manual mode the predicted time is displayed for the operators information but no control action is taken based on its value. In timed automatic mode action is taken only if the predicted inlet pressure at the time set by the operator is greater than the pressure setpoint $P_{sp}$. In this case timed automatic mode operate in the same manner as if the fiber were in automatic mode.

The amount of bodyfeed remaining in the tank, $V_{bf}$, is continuously monitored. Knowing this and the $T_{sp}$ predicted from the LSF, the required bodyfeed rate can be calculated as:

$$F_{bf} = V_{bf}/(T_{sp} - T) \quad (3)$$

Where: T is the elapsed operating time.

The bodyfeed pump cycle time $\Theta_{bf}$, is then calculated as:

$$\Theta_{bf} = V_p/F_{bf} TM \quad (4)$$

Where $V_p$ is the volume per stroke.

Control Algorithm Tuning

The automatic control algorithm attempts to prolong the operating time of a bodyfeed filtering system by monitoring the load on the filter and adjusting the bodyfeed flow rate. There are several parameters that are implemented in the control program that provide a means of tuning this algorithm. Tuning is necessary in order to match the sensitivity and responsiveness of the algorithm to the various types of applications where a bodyfeed filter system can be used.

The two main parameters are the frequency at which points are sampled from the filter and the size of the prediction windows.

Sampling Frequency—The control program is a control loop that runs periodically. Each time it "wakes up" it read all of its inputs, calculates the required outputs which it then sets, and then goes back to "sleep" until it is time to run again. This control loop cycle time is set in the program and determines the frequency with which data is sampled.

It is best to sample frequently when the data being read is subject to noise. This results in a form of data averaging. When the data being read is stable, the sampling frequency can be relatively infrequent, since the values read are more likely to be accurate.

Sample Size—The sample size is also set in the program and defines the size of the window used in the LSF calculations. Since samples are taken each time the control loop runs, the width of the window, in time, is determined by the product of the sample size and the control loop cycle time. For example, a sample size of 40 and a control loop cycle time of 15 seconds would correspond to a 10 minute moving window.

The size of the moving window determines how quickly the control algorithm will respond to changes in the filter inlet pressure. Smaller window sizes are best for applications where the contamination load changes over a large range and/or quick response time is desired. Larger windows are less responsive and are best where changes fluctuate rather rapidly over a smaller range.

PROGRAM STRUCTURE AND FLOW LOGIC

The following is a description of the structure and flow logic of the control program. It is presented in pseudo code which is a descriptive form of program documentation that uses English language commentary within logic programming constructs. It uses indentation and square brackets, [. . . ], to group descriptions of equal hierarchy and execution order. Programming operators and constructs are shown in bold type.

The main control program consists of two primary execution phases. The first phase initializes all system constants, variables and state vectors. The second phase is the control loop which is effectively a never ending DO loop. The control loop is driven by an interrupt that is generated by an interval timer that is set to the control loop cycle time. In addition to the main program, several subroutines exist that perform functions such as the LSF calculations, converting values to BCD representation for display in the PLC, and resetting state vectors and variables during transition of a clean cycle.

The pseudo code descriptions of these programs follows. The main program is described first, followed by descriptions of the subroutines.

```
Main program [
    Define and initialize all program constants and variables.
    Establish correspondence with PLC variables and I/O
    locations. Initialize the system state vector and the
    interrupt timer for the control loop.
    DO FOREVER [ Enter the control loop.
        Read mode settings from the PLC.
        IF (no modes are set) THEN [
            Set defaults.
            GOSUB DEFBCD
            GOTO CWAIT Wait for next control loop cycle.
        ]
        Read from PLC . . .
            Filter Inlet Pressure.
          - Bodyfeed Tank Level.
            Bodyfeed Pump Count.
        Convert and range check input values.
        Read from PLC . . .
            Mill Running Status.
            Filter On-line Status.
        IF (Filter is not on-line) THEN [
            Set state to "Clean Cycle".
            Set defaults.
            GOSUB DEFCD
            GOTO CWAIT Wait for next control loop cycle.
        ]
        Read from PLC . . .
            Bodyfeed Pump Status.
        IF (Bodyfeed pump is stopped AND Filter
            is "Running") THEN
        [
            Reset elapsed time
            GOSUB CWAIT Wait for next control cycle
        ]
        IF (Filter "Not Running") THEN [
            GOSUB FINIT Re-initialize filter size
            Set filter to "Running"
        ]ELSE[
            Get elapsed time and update total fiber time
```

-continued

```
]
GOSUB LSF Perform Least Squares Fit
IF (Sample window contains a full set of points) THEN [
    Update and range check the bodyfeed pump's
    volume per stroke
]
PCC=Psp Pcc and Tcc are predicted values at end of run
IF (Filter is in Timed Automode) THEN [
    Calculate Pcc = Slope * Total Time to Run
]
IF (The inlet pressure is not increasing
    (Slope <=0)) THEN
[
        IF (Filter is in Timed Automode) THEN [
            Calculate predicted time of clean cycle Tcc =
            Total Time to Run
        ]ELSE[
            Set Time Remaining and Tcc to largest displayable
            values (99.9)
        ]
]ELSE[ (Inlet pressure is increasing)
    Calculate Tcc = (Pcc – P0) / Slope
    Calculate Time Running
]
IF (Filter is in Manual mode) THEN [
    Read from PLC ...
        Bodyfeed Pump Status.
        Bodyfeed Rate.
    IF (Bodyfeed pump is on AND
        Bodyfeed Rate>0) THEN [
        Calculate Time Remaining = Bodyfeed Volume
        Remaining/Bodyfeed Rate
    ]ELSE]
        Set Bodyfeed Rate = 0
        Set Time Remaining = 99.9 hours
    ]
]ELSE[
    IF (Filter Inlet Pressure>Psp OR Bodyfeed Volume
        Remaining<=0) THEN [
        Set Time Remaining and Bodyfeed Rate = 0
        Set Bodyfeed Pump Interval to maximum.
    ]
]ELSE[
    IF (Filter Inlet Pressure>Psp OR Bodyfeed Volume
        Remaining <=) THEN [
        Set Time Remaining and Bodyfeed Rate = 0
        Set Bodyfeed Pump Interval to maximum.
    ]ELSE[
        IF (Time Remaining <= 0) THEN [
            Set Bodyfeed Interval to maximum
            IF (Bodyfeed pump is "Running") THEN [
                Write to PLC ...
                    Bodyfeed Pump Interval.
            ]
        ]ELSE[
            Calculate required Bodyfeed Rate = Bodyfeed Tank
            Level/Time Remaining.
            Calculate required Bodyfeed Pump Interval.
            IF (Bodyfeed Pump Status is
                "Running") THEN [
                IF (Mill is "Not Running" AND
                    Slope <= 0) THEN [
                    Set Bodyfeed Status to "Not Running"
                ]
            ]ELSE[
                IF (Mill is "Running ") THEN [
                    Set Bodyfeed Status to "Running".
                ]
            ]
            IF (Bodyfeed Pump Status is "Not Running") THEN [
                Write to PLC ...
                    Bodyfeed Pump Interval = 0 (turns off the pump)
                Set time remaining to 99.9 hours.
            ]ELSE[
                Calculate required Bodyfeed Pump Interval.
                Write to PLC ...
                    Bodyfeed Pump Interval (turns off the
                    pump)
                Calculate Time Remaining
            ]
        ]
    ]
]
```

```
        Convert Time Remaining and Bodyfeed Rate
        to display format
        Write to PLC display ...
            Time Remaining.
            Bodyfeed Rate.
CWAIT:
    Convert calculated Bodyfeed pump volume
    per stroke to PLC units.
        Write to PLC ...
            Calculated Bodyfeed pump volume per stroke.
        Convert FIlter Inlet Pressure, Bodyfeed Tank Level to
        display format.
        Write to PLC display ...
            Filter Inlet Pressure.
            Bodyfeed Tank Level.
        Restart the control loop timer.
        Wait for next control loop cycle.
    ]       End of control
]   End of Main program.
Subroutine DEFBCD [
        Set display variables for Bodyfeed Rate and Time
        Remaining to zero.
        Write to PLC display ...
            Bodyfeed Rate.
            Time Remaining.
        Return to caller.
]   End of DEFBCD
Subroutine FINIT [
        Clear all data from the sample window and reset all
        LSF parameters and variables.
        Set P0 = FIlter Inlet Pressure.
        Set Slope = Psp/86400. (86400 is seconds in 24 hours)
        Set Bodyfeed pump parameters to nominal based on 0.10
        Gallons/Stroke.
        Set Bodyfeed Rate to exhaust current supply in 24 hours.
        IF (Bodyfeed Rate <= 0) THEN [
            Set Bodyfeed Pump Interval to maximum.
        ]ELSE[
            Set Bodyfeed Pump Interval to match Bodyfeed
            Rate.
        ]
        Set Bodyfeed Pump Count to current value and set pump
        status to "Not Running".
        ]
        Set Bodyfeed Pump Interval to match Bodyfeed Rate.
        ]
        Set Bodyfeed Pump Count to current value and set pump
        status to "Not Running".
        Initialize running time to zero.
        IF (Filter is in Timed Automode) THEN [
            Read from PLC ...
                Total Time to Run.
        ]
]   End of FINIT
Subroutine ITOBCD (i) [
        Convert the integer value i to BCD representation.
        Return the BCD value to the caller.
]   End of ITOBCD
Subroutine LSF [
        IF (Number of points collected < Number points to
            collect) THEN [
            Calculate the values of P0 and Slope.
        ]
]   End of LSF
Subroutine LSFUP [
        Add the new values of Filter Inlet Pressure and Total
        Filter Time to data arrays.
]   End of LSFUP
```

What is claimed is:

1. In a filter process for a filter including:

a filter;

filter media within said filter for permitting permeable flowthrough of fluid to be filtered, said filter entraining particulate contaminants on passage of said fluid to be filtered through said filter;

a predetermined volume of bodyfeed for addition to said fluid containing said particulate media to reach an operating end point whereby said filter has a differential pressure across said filter requiring said filter to be cleaned; and, means for introducing said bodyfeed to said fluid to be filtered to augment said filter;

the improvement to said means for introducing said bodyfeed comprising the steps of:

providing a time input for inputting time increments during the operating time of said filter;

providing means for measuring the differential pressure across said filter;

providing at least sufficient bodyfeed for augmenting the performance of said filter until said filter reaches said differential pressure endpoint;

providing means for measuring the predetermined volume of bodyfeed transmitted to said fluid to be filtered;

making a first pressure differential measurement at a first time increment;

storing said first pressure differential as a function of time in computer memory;

making a second pressure differential measurement at a second time increment;

storing said second pressure differential as a function of time in computer memory;

determining the rate of change of said pressure differential as a function of time between said first pressure differential measurement and said second pressure differential measurement;

predicting the operating time said filter will reach said end point; and, adding said bodyfeed at a rate whereby said filter will have received all said volume of bodyfeed by the time said filter reaches said endpoint of operating differential pressure.

2. The process of claim 1 and wherein said bodyfeed is supplied by a bodyfeed tank having only sufficient bodyfeed for said filter to reach said endpoint.

3. The process of claim 1 and including the steps of:
making a series of pressure differential measurements at successive time increments;
storing said series of pressure differential measurements as a function of time in computer memory.

4. The process of claim 3 and wherein said series of pressure differential measurements is made over a time period less than the predicted time period required for said filter to reach said differential pressure endpoint.

5. In a filter process for a filter including:
a filter;
filter media within said filter for permitting permeable flowthrough of fluid to be filtered, said filter entraining particulate contaminants on passage of said fluid to be filtered through said filter;
a predetermined volume of bodyfeed for addition to said fluid containing said particulate media during a predetermined time; and,
means for introducing said bodyfeed to said fluid to be filtered to augment said filter;
the improvement to said means for introducing said bodyfeed comprising the steps of:
providing a set time input for a maximum time that the filter will run;
providing a bodyfeed injection rate that will deplete all of said predetermined volume of bodyfeed during said set time;
providing means for measuring a differential pressure across said filter said volume;
providing at least sufficient bodyfeed for augmenting the performance of said filter until said filter reaches said set time;
making a first pressure differential measurement at a first time increment;
storing said first pressure differential as a function of time in computer memory;
making a second pressure differential measurement at a second time increment;
storing said second pressure differential as a function of time in computer memory;
determining the rate of change of said pressure differential as a function of time between said first pressure differential measurement and said second pressure differential measurement;
predicting the operating endpoint time said filter will reach an operating end point whereby said filter has a differential pressure across it requiring it to be cleaned;
comparing said operating time to said set time; and,
increasing said bodyfeed injection rate if said operating endpoint time is less than said set time whereby said filter will have received all of said bodyfeed by the time said filter reaches said operating endpoint time.

6. In a filter process for a filter including:
a filter;
filter media within said filter for permitting permeable flowthrough of fluid to be filtered, said filter entraining particulate contaminants on passage of said fluid to be filtered through said filter;
a predetermined volume of bodyfeed for addition to said fluid containing said particulate media; and,
means for introducing said bodyfeed to said fluid to be filtered to augment said filter;
the improvement to said means for introducing said bodyfeed comprising the steps of:
providing means for selecting a mode of operation for said filter including either one of a set time mode or a pressure mode;
determining an operating time that said filter will run;
selecting an initial body feed injection rate so that all of said predetermined volume of body feed will be added to the fluid by the time said filter reaches said operating time;
providing means to continuously measure a pressure differential across said filter and for determining an endpoint time corresponding to a pressure setpoint whereby said filter has a differential pressure across it requiring it to be cleaned; and
providing means for adjusting said body feed injection rate;
whereby for said time mode said bodyfeed injection rate is adjusted only if said endpoint time is less than said operating time so that all of said predetermined volume of bodyfeed will be added to said fluid by the time said filter reaches said endpoint time;
and whereby for said pressure mode said bodyfeed injection rate is adjusted if said endpoint time is greater than or less than said operating time so that all of said predetermined volume of bodyfeed will be added to said fluid by the time said filter reaches said endpoint time.

* * * * *